(12) United States Patent
Cho et al.

(10) Patent No.: US 10,019,150 B2
(45) Date of Patent: Jul. 10, 2018

(54) METHOD AND APPARATUS FOR CONTROLLING CURSOR IN PORTABLE DEVICE

(71) Applicant: Samsung Electronics Co., Ltd., Gyeonggi-do (KR)

(72) Inventors: Pyoje Cho, Gyeonggi-do (KR); Chulhwan Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 599 days.

(21) Appl. No.: 14/566,129

(22) Filed: Dec. 10, 2014

(65) Prior Publication Data

US 2015/0160823 A1 Jun. 11, 2015

(30) Foreign Application Priority Data

Dec. 10, 2013 (KR) ........................ 10-2013-0152899

(51) Int. Cl.
*G06F 17/22* (2006.01)
*G06F 3/0488* (2013.01)
*H04M 1/725* (2006.01)

(52) U.S. Cl.
CPC .. *G06F 3/0488* (2013.01); *G06F 2203/04805* (2013.01); *H04M 1/72552* (2013.01); *H04M 2250/70* (2013.01)

(58) Field of Classification Search
CPC ........ G06F 3/0488; G06F 2203/04805; H04M 2250/70; H04M 1/72552
See application file for complete search history.

(56) References Cited

U.S. PATENT DOCUMENTS

| | | | | |
|---|---|---|---|---|
| 6,686,902 B2* | 2/2004 | Lee | ........................ | G06F 3/0236 345/157 |
| 7,009,600 B2* | 3/2006 | Jones | .................... | G06F 3/0481 345/173 |
| 7,075,512 B1* | 7/2006 | Fabre | .................... | G06F 3/0481 345/156 |
| 7,155,671 B1* | 12/2006 | Kim | ...................... | G06F 17/273 715/202 |
| 7,658,562 B2* | 2/2010 | Suess | .................... | G06F 3/0202 341/22 |
| 7,969,421 B2* | 6/2011 | Huh | .................... | G06F 3/04886 345/169 |
| 8,044,937 B2* | 10/2011 | Shin | .................... | G06F 3/04886 345/168 |
| 8,436,818 B2* | 5/2013 | Park | .................... | G06F 3/04886 178/18.06 |
| 2001/0048428 A1* | 12/2001 | Ukita | .................... | G06F 1/1626 345/169 |
| 2002/0041261 A1* | 4/2002 | Lee | ........................ | G06F 3/0236 345/27 |
| 2002/0122197 A1* | 9/2002 | Abir | ...................... | G06F 3/0488 358/1.11 |
| 2004/0160419 A1* | 8/2004 | Padgitt | ................ | G06F 3/04842 345/173 |

(Continued)

*Primary Examiner* — Maikhanh Nguyen

(74) *Attorney, Agent, or Firm* — The Farrell Law Firm, P.C.

(57) ABSTRACT

A method and apparatus for controlling a cursor in a portable terminal is provided. The method includes displaying a character on a screen, modifying the character and displaying the modified character, when a position of a cursor is designated, and restoring the modified character, when the designation of the position of the cursor is cancelled.

16 Claims, 5 Drawing Sheets

(56) References Cited

U.S. PATENT DOCUMENTS

| | | | | |
|---|---|---|---|---|
| 2004/0165924 | A1* | 8/2004 | Griffin | G06F 1/1626 400/486 |
| 2005/0089226 | A1* | 4/2005 | Chang | G06K 9/222 382/181 |
| 2005/0093826 | A1* | 5/2005 | Huh | G06F 3/04886 345/168 |
| 2006/0181519 | A1* | 8/2006 | Vernier | G06F 3/04886 345/173 |
| 2007/0070089 | A1* | 3/2007 | Asai | G09G 5/26 345/660 |
| 2007/0229476 | A1* | 10/2007 | Huh | G06F 3/04886 345/173 |
| 2007/0257896 | A1* | 11/2007 | Huh | G06F 3/04886 345/173 |
| 2008/0012835 | A1* | 1/2008 | Rimon | G06F 3/038 345/173 |
| 2008/0096610 | A1* | 4/2008 | Shin | G06F 3/04886 455/566 |
| 2008/0318617 | A1* | 12/2008 | Ladouceur | G06F 1/1626 455/550.1 |
| 2009/0051669 | A1* | 2/2009 | Shin | G06F 3/0236 345/173 |
| 2009/0058809 | A1* | 3/2009 | Vuong | G06F 3/0233 345/168 |
| 2009/0137279 | A1* | 5/2009 | Silfverberg | H04M 1/23 455/566 |
| 2010/0020043 | A1* | 1/2010 | Park | G06F 3/0416 345/174 |
| 2010/0153362 | A1* | 6/2010 | Hong | G06F 11/1438 707/718 |
| 2011/0227844 | A1* | 9/2011 | Kim | G06F 3/04883 345/173 |
| 2012/0326978 | A1 | 12/2012 | Tokita | |
| 2013/0125067 | A1* | 5/2013 | Moon | G06F 3/04812 715/862 |

* cited by examiner

METHOD AND APPARATUS FOR CONTROLLING CURSOR IN PORTABLE DEVICE

PRIORITY

This application claims priority under 35 U.S.C. § 119(a) to Korean Patent Application No. 10-2013-0152899, filed on Dec. 10, 2013, the entire disclosure of which is incorporated herein by reference.

BACKGROUND

1. Field of the Invention

The present invention relates generally to a method for controlling a position of a cursor in a portable terminal, and more particularly, to a method for more accurately moving a position of a cursor.

2. Description of the Related Art

A portable terminal equipped with a touch screen may control inputting a character. For example, a character may be input into a keyword input box, a text message (Short Message Service (SMS)) input box, a Multimedia Message Service (MMS) input box, and a schedule input box. The input character may need to be corrected by a user. According to the conventional art, to correct the input character, the user touches the touch screen at a desired location among the input characters in order to position the cursor next to the character that the user wishes to correct. However, the user may have difficulty in placing the cursor in the desired location due to the difficulty in positioning the touch in an accurate location among characters with a small font size.

SUMMARY

The present invention has been made to address at least the problems and the disadvantages described above, and to provide at least the advantages described below.

Accordingly, an aspect of the present invention is to provide an apparatus and a method for accurately moving a position of a cursor and for accurately selecting predetermined characters.

Another aspect of the present invention provides a method which enlarges a space between characters, so that a user may accurately adjust the position of the cursor and select predetermined characters.

In accordance with an aspect of the present invention, a method for controlling a cursor in a portable terminal is provided. The method includes displaying a character on a screen, modifying the character and displaying the modified character, when a position of a cursor is designated, and restoring the modified character, when the designation of the position of the cursor is cancelled.

In accordance with another aspect of the present invention, an apparatus for controlling a position of a cursor in a portable terminal is provided. The apparatus includes a display panel configured to display a character and a cursor, a touch panel configured to sense a designation of a position of the cursor, and sense a cancellation of the designation of the position of the cursor, and a controller configured to modify a character and display the modified character, when the position of the cursor is designated, and to restore the modified character, when the designation of the position of the cursor is cancelled.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
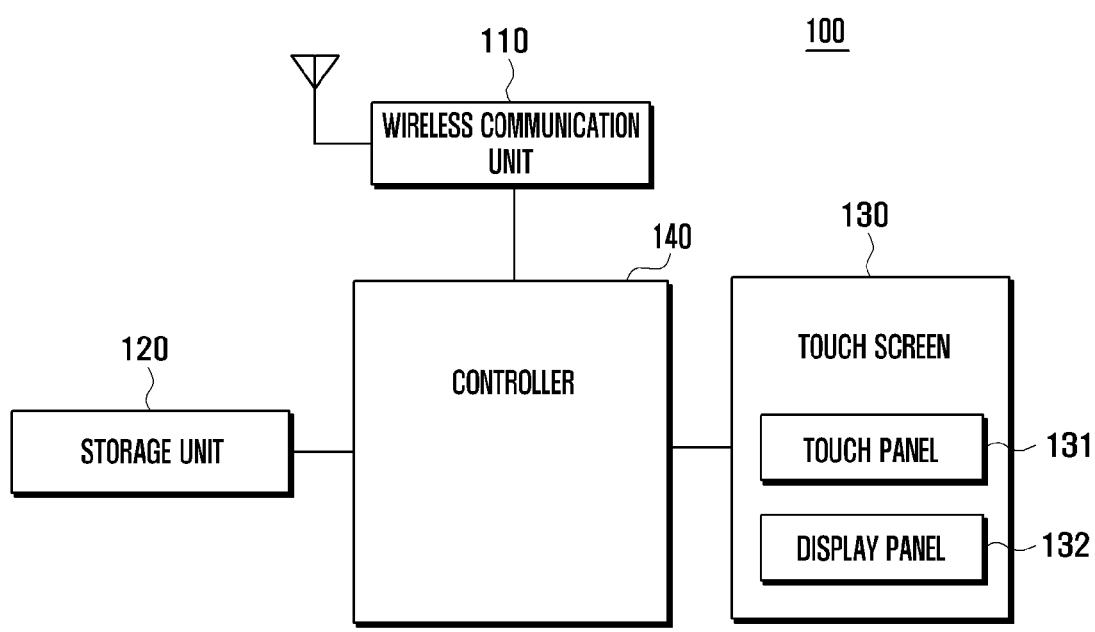
FIG. 1 is a block diagram of a configuration of a portable terminal, according to an embodiment of the present invention.

Hereinafter, embodiments of the present invention will be described more fully with reference to the accompanying drawings. It should be noted that the same elements will be designated by the same reference numerals although they are shown in different drawings. Further, detailed descriptions related to well-known functions or configurations capable of making the subject matter of the present invention unnecessarily obscure will be omitted.

The embodiments of the present invention shown and described herein correspond to specific examples presented in order to easily explain technical contents of the present invention, and to help comprehension of the present invention, but are not intended to limit the scope of the present invention. It will be apparent to those having ordinary knowledge in the technical field to which the present disclosure pertains, that it is possible to practice other modified embodiments based on the technical idea of the present invention as well as the embodiments disclosed herein.

In an embodiment of the present invention, the term 'character' includes text, a number, a special symbol, and the like that a user inputs in an input screen (for example, a text message input screen or a keyword input screen). In addition, the term 'character' may also include an image, a video, and the like, displayed on a display screen (for example, an electronic document, Internet execution screen, or a text message).

In an embodiment of the present invention, the term 'cursor' refers to a sign for indicating a position of an input provided on an input screen. A position of a cursor may be changed by a 'handler'. The handler may be used for selecting an area of characters.

FIG. 1 is a block diagram of a configuration of a portable terminal, according to an embodiment of the present invention.

Referring to FIG. 1, a portable terminal 100 includes a wireless communication unit 110, a storage unit 120, a touch screen 130, and a controller 140. The wireless communication unit 110 performs a voice call, a video call, or data communication with an external device over a network under the control of the controller 140. The wireless communication unit 110 may include a wireless frequency transmitting unit for upward converting and amplifying a frequency of a transmitted signal, and a wireless frequency receiving unit for low-noise amplifying and downward converting a frequency of a received signal. In addition, the wireless communication unit 110 may include a mobile communication module (for example, CDMA, LTE, WCDMA, and the like), a digital broadcasting module (for example, a DMB module), or a short range communication module (for example, a Wi-Fi module, a Bluetooth module, and a Near Field Communication (NFC) module).

The storage unit 120 includes a program memory for storing a program so as to operate the portable terminal 100, and a data memory for storing data generated while a program is executed. In particular, in an embodiment of the present invention, the storage unit 120 may store an original sized space between characters and an enlarged sized space between the characters.

The touch screen 130 includes a touch panel 131 and a display panel 132. In addition, the touch panel 131 may be integrated with the display panel 132. The display panel 132 may be embodied by a Liquid Crystal Display (LCD), an Organic Light Emitting Diode (OLED), or an Active Matrix Organic Light Emitting Diode (AMOLED). In particular, the display panel 132 may enlarge a space between the characters for display when a position of a cursor is moved. In an embodiment of the present invention, the touch panel 131 senses an event for moving a cursor and an event of selecting a partial area. The partial area is defined as the characters selected from the input characters.

The controller 140 controls general operations of the portable terminal 100. In particular, when an event of moving a position of a cursor is sensed on a screen that displays a character, the controller 140 enlarges a space between the characters to a predetermined size. In addition, the controller 140 displays the cursor at a position corresponding to the event. In addition, the controller 140 senses an event of selecting an area of input characters. The area of the input characters is a unit formed of at least one character, for example, a phrase, a sentence, and the like. When the event of selecting an area of the input characters is generated, the controller 140 enlarges a space between the characters for display.

In addition, when an event of changing a position of the cursor so as to terminate the movement of the cursor is cancelled, the controller 140 restores an enlarged space to an original size for display. The cursor is displayed at a position where the event of changing the position is cancelled. The position where the event of changing the position of the cursor is cancelled may be next to a currently input character, or may be next to the entire set of input characters.

Figure 2:
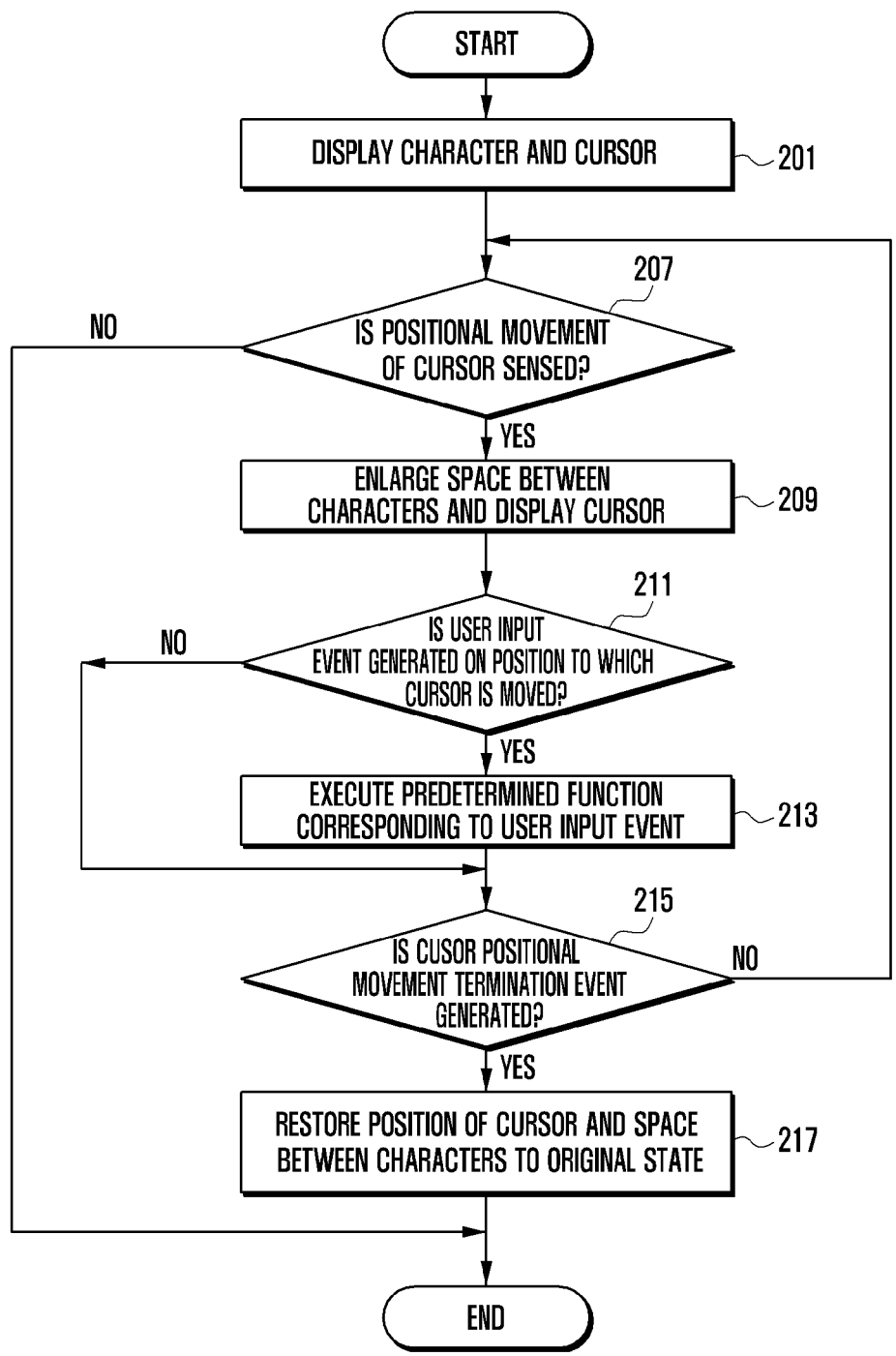
FIG. 2 is a flowchart illustrating a procedure of moving a position of a cursor on an input screen of a touch screen of a portable terminal, according to an embodiment of the present invention.
Figure 3:
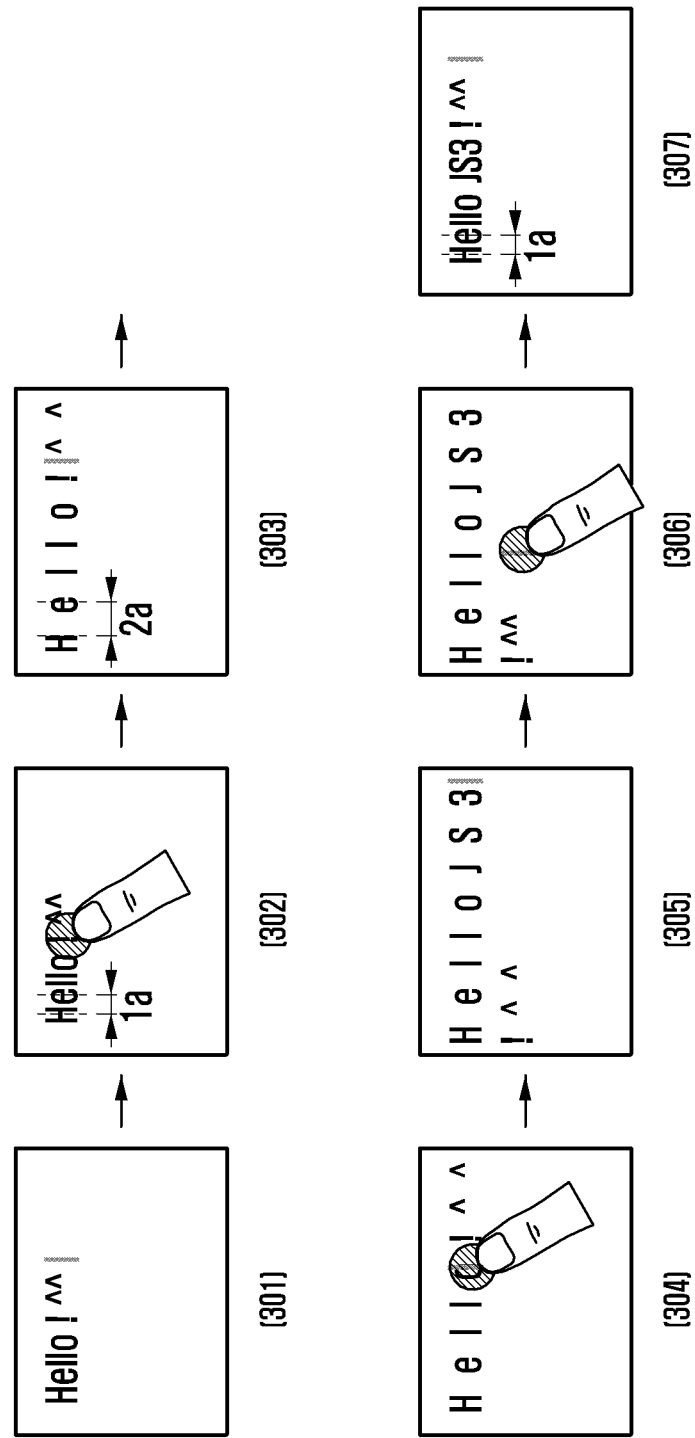
FIG. 3 is a diagram illustrating an example of moving a position of a cursor on an input screen of a touch screen of the portable terminal, according to an embodiment of the present invention.

FIG. 2 is a flowchart illustrating a procedure of moving a position of a cursor on an input screen of a touch screen of a portable terminal, according to an embodiment of the present invention. FIG. 3 is a diagram illustrating an example of moving a position of a cursor on an input screen of a touch screen of a portable terminal, according to an embodiment of the present invention.

Referring to FIGS. 2 and 3, at step 201, the controller 140 displays a character and a cursor on a touch screen of the portable terminal, as shown in screen 301. In the embodiments of the present invention described herein, a character will be presumed to be a text, a number, or a special symbol that a user inputs on an input screen (for example, a character message input screen and a keyword input screen). When a character is input into an input screen, the controller 140 displays a cursor next to a position where the character is input, as shown in screen 301.

The controller 140 determines whether an event of moving a position of the cursor is sensed at step 207. When the event of moving the position of the cursor is generated, at step 209, the controller 140 enlarges for display, the space between the characters and displays the cursor in the enlarged space, as shown in screen 303. For example, an original space 1*a* is shown between the characters 'H' and 'e' in screen 302. When the event of moving the position of the cursor is generated, the characters are enlarged and the original space 1*a* is enlarged to enlarged space 2*a* (for example, the space is enlarged twice its original size) for display, as shown in screen 303. When the size of the space between the characters is enlarged for display, the controller 140 may enlarge the size of the space adjacent to the position of the cursor or in an area surrounding the position of the cursor—e.g., in an upward, downward, left, and right directions from the position of the cursor. The controller 140 displays the cursor at a position where a cursor movement event is sensed. Accordingly, the controller 140 may display the cursor before the character '!', as shown in screen 304.

The controller 140 determines, at step 211, whether a user input event is generated at the position to which the cursor is moved. For example, the user input event may be an event of inputting and deleting a character. The controller 140 performs a predetermined function corresponding to the user input event at step 213. A user input event is generated when a user inputs a character at the position to which the cursor is moved (e.g., as shown in screen 304, the cursor is positioned before the '!'). For example, when it is determined that a user input event of inputting characters 'JS3' is generated, the controller 140 inputs 'JS3' is at the location of the cursor and displays 'Hello JS3!^^', as shown in the screen 305, in response to the user input event. After the input of 'JS3', the controller 140 positions the cursor immediately after the newly inserted characters.

When a user input event (for example, inserting a character, deleting a character, inputting an indent, inputting a line feed, converting a Hangul character into a Chinese character, and the like) is not sensed at the position to which the cursor is moved at step 211, the controller 140 proceeds with step 215 and checks whether a cursor movement termination event is generated.

When the cursor movement termination event is generated, the controller 140 displays the cursor at a movement stop position and restores the size of the space between the characters to an original state for display, at step 217. For example, in a state in which the character is displayed with enlarged space 2*a* between the characters, as shown in screen 306, the cursor movement termination event is generated at the end of the entire set of input characters. When the cursor movement termination event is generated, the controller 140 restores the size of the space between the characters to original space 1*a* for display, as shown in screen 307.

Accordingly, the controller 140 displays the cursor at a position where the positional movement of the cursor is terminated. Here, the position where the positional movement of the cursor is terminated may be a position at the end of the entire set of input characters, which is identical to an existing scheme, a position set by a user in advance, or a position where movement is currently terminated.

When the cursor is not moved during a predetermined period of time, the controller 140 restores the size of the space between the characters to an original state for display, as shown in screen 307, and displays the cursor at a position where the positional movement of the cursor is terminated. That is, when the cursor movement termination event is generated or the movement of the cursor is not generated during a predetermined period of time, the controller 140 restores the size of the space between the characters to an original state, and displays the same.

When the cursor movement termination event is not sensed at step 215, the controller 140 proceeds to step 207 and checks whether the cursor is moved to another position, and repeatedly executes the subsequent steps.

As described above, in an embodiment of the present invention, when a character is input into a screen of a portable terminal that is capable of receiving an input of a character, the cursor is displayed after the input character. When an event of changing the position of the cursor is generated, the controller 140 displays the cursor at a position where the event is sensed. When a cursor movement event is generated, the controller 140 enlarges the size of the space between the characters for display. In this instance, the controller 140 enlarges, for display, the size of the space between the characters which are adjacent to the position of the cursor or within a predetermined area from the cursor. The size of the space between the characters is enlarged, and thus a user may more accurately move the position of the cursor. When the cursor movement termination event is generated, the controller 140 restores, for display, the enlarged characters and the space between the characters to an original size.

Figure 4:
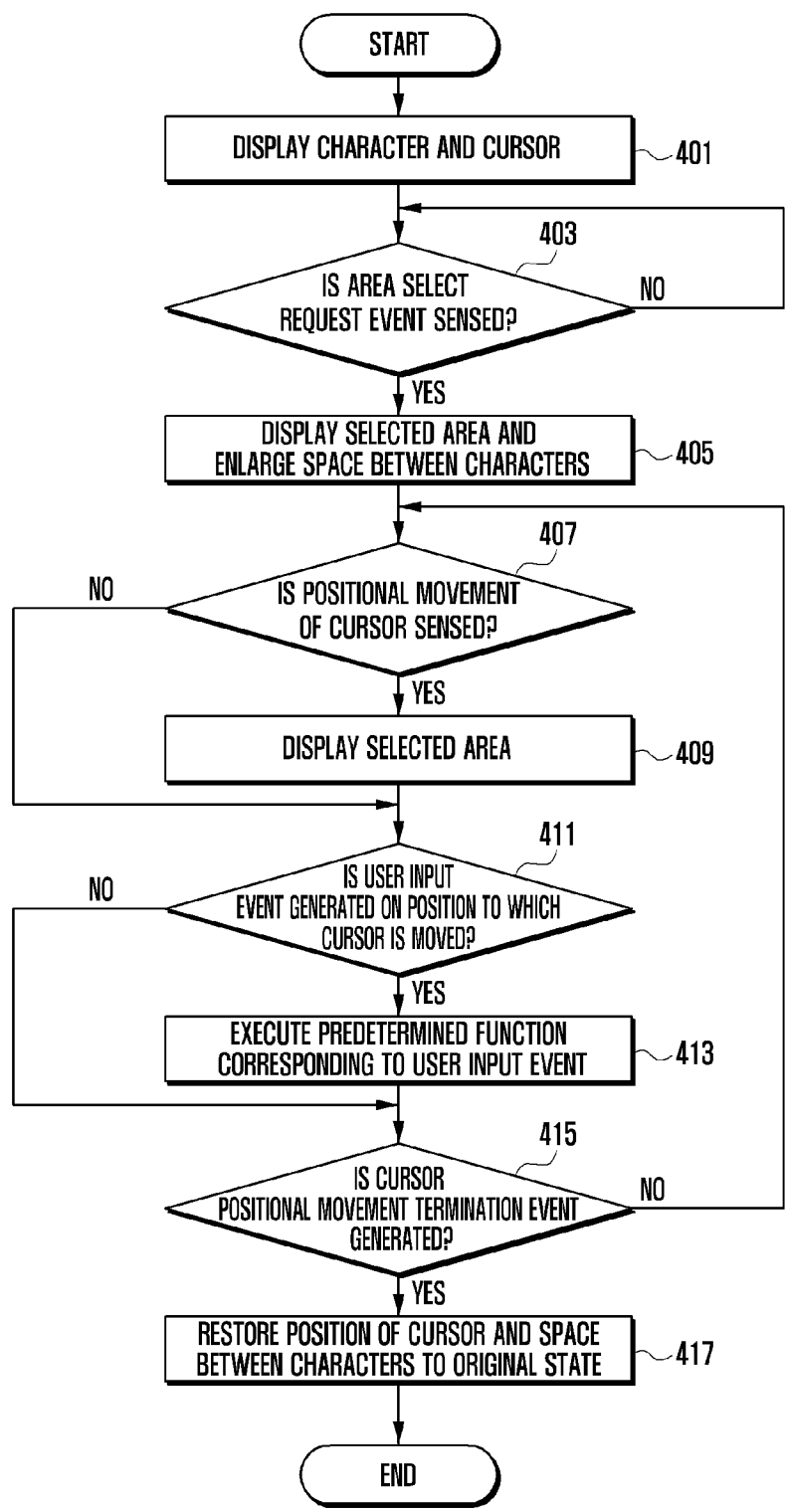
FIG. 4 is a flowchart illustrating a procedure of selecting an area of input characters by moving a position of a cursor in a portable terminal, according to an embodiment of the present invention.
Figure 5:
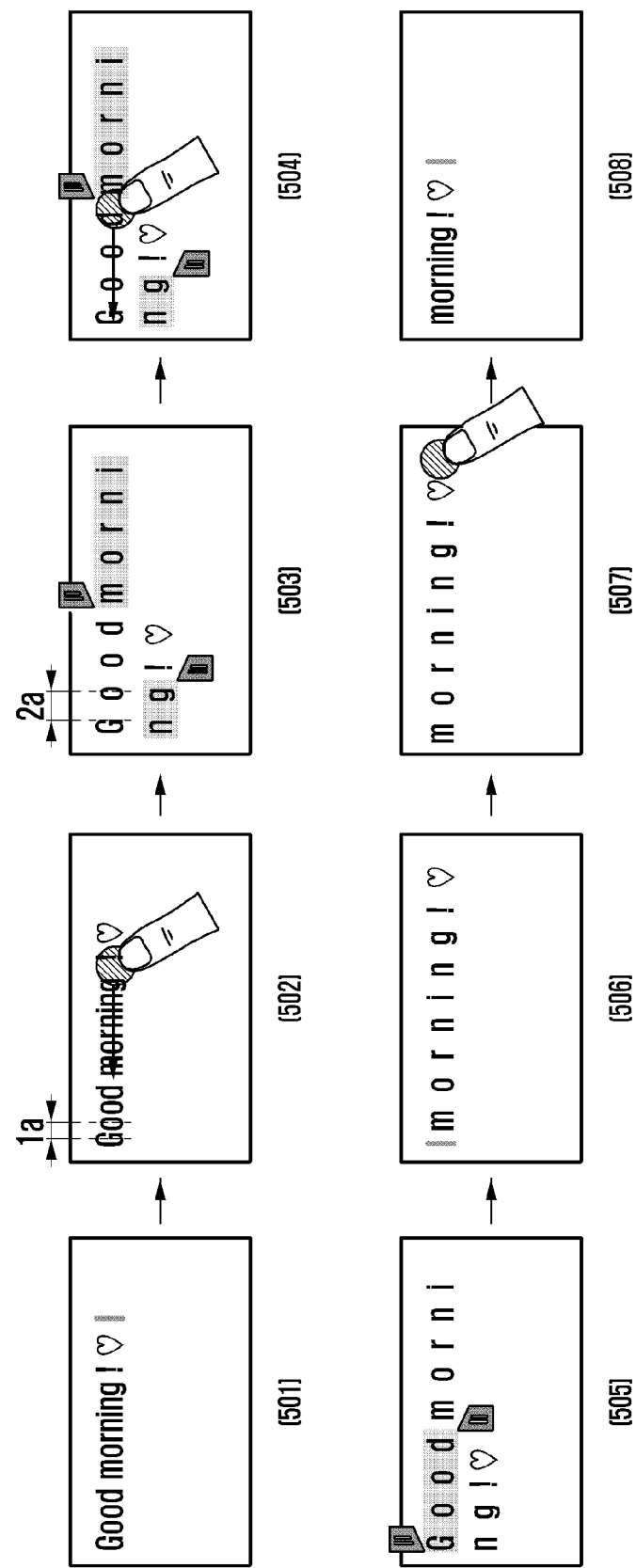
FIG. 5 is a diagram illustrating an example of selecting an area of input characters in a portable terminal, according to an embodiment of the present invention.

FIG. 4 is a diagram illustrating a procedure of selecting an area of input characters by moving a position of a cursor in a portable terminal, according to an embodiment of the present invention. FIG. 5 is a diagram illustrating an example of selecting an area of input characters in a portable terminal, according to an embodiment of the present invention.

Referring to FIGS. 4 and 5, the controller 140 displays a character and a cursor at step 401. The character may be text, a number, and a special symbol that a user inputs into an input screen (for example, a text message input screen and a keyword input screen), and is displayed on a display screen (for example, an electronic document, a text message display (reception) screen, a search result display screen, and the like), but is not limited thereto. Hereinafter, a character will be presumed to be a text, a number, or a special symbol that a user inputs into an input screen.

The controller 140 determines whether an area select request event for enlarging the size of the space between the characters of a selected area is sensed in a character input screen, at step 403. The controller 140 displays the selected area and enlarges, for display, the size of the space between the characters which are within the selected area, at step 405, in response to the area select request event. When an area is selected, the controller 140 displays a handler at the beginning and/or end of the selected area. Simultaneously, the controller 140 then enlarges the size of the space between the characters which are within the selected area, and displays the same. When the selected area is enlarged, a user may more accurately adjust the selection of an area. Here, the area select request event may be a drag event, a swipe event, a drag-and-drop event, a pinch zoom event, a hovering event, and the like, that is detected from a character input screen. Referring to screen 501 of FIG. 5, the controller 140 displays input characters reading 'Good morning!♡ ', on the character input screen, and the cursor is located at the position where input is terminated.

In a state in which the input characters and the cursor are displayed, the controller 140 may sense an area select request event as shown in screen 502. For example, the area select request event may be a drag event provided in the direction of the arrow (i.e., from the right to the left), and may select a partial area of a content. In this instance, characters are displayed with an original space 1a, and the position of the cursor is displayed before the 'm' which is the position where the area select request event is terminated.

The controller 140 processes the area selected in response to the area select request event. For example, the controller 140 processes the selected area by shading, highlighting, or underlining, and displays the same, as shown in screen 503. The controller 140 displays the cursor which may include two handlers for displaying a selected area in response to the area select request event. Simultaneously, the controller 140 enlarges the characters and the space between the characters by, for example, two times the original space, and displays the same. For example, when each original size of the space is original space 1a, the enlarged size of the space may be enlarged space 2a.

In a state in which the input characters and two handlers are displayed, the controller 140 may select an area by moving the handlers. When the positional movement of the cursor, which is displayed as a handler, is sensed at step 407, the controller 140 displays the selected area at step 409. The controller 140 adjusts the selected area through the positional movement of the cursor. Screen 504 is an example of a screen that displays a cursor in a state in which the area select request event is sensed. Here, the cursor may be a first handler and a second handler. For example, when the word 'morning' is the area selected, the controller 140 displays the first handler before the 'm' and the second handler after the 'g'. In a state in which the word 'morning' is the area selected through the first handler and the second handler, as shown in screen 504, the controller 140 senses the movement of the cursor. An event may be sensed that moves the first handler, which is positioned before the 'm' in 'morning', in a left direction to be positioned before the 'G' in 'Good'. Another event may be sensed that moves the second handler, which is positioned after the 'g' in 'morning', in a left direction to be positioned after the 'd' in 'Good'. The controller 140 may then control to shade, highlight, or underline the word 'Good' in the selected area in response to the event of moving the cursor, and display the same.

When it is sensed that a user input event is generated at a position to which the cursor is moved in step 411, the controller 140 performs a predetermined function corresponding to the user input event. Here, the user input event may be an event to insert a character, delete a character, input an indent, input a line feed, convert a Hangul character into a Chinese character, or the like. For example, referring to screen 505, the controller 140 may sense a user input event that deletes the selected area in a state in which the word 'Good' is the selected area. Subsequently, the controller 140 deletes 'Good' in response to the user input event, as shown in screen 506.

When a cursor movement termination event is generated, the controller 140 restores the position of the cursor and the size of the space between the characters, so as to display the characters and the space between the characters with an original size, at step 417. Here, the cursor movement termination event may be one of a touch event, a tap event, a flick event, a pen-touch event, a double-touch event, and a double-tap event that is provided at the end of the input characters. The original position of the cursor may be the end of the input characters or at a predetermined position. In addition, when the positional movement of the cursor does not occur during a predetermined period of time, the controller 140 determines that the positional movement of the cursor is terminated. When the positional movement of the cursor is terminated, the controller 140 restores the position of the cursor and the size of the space, so as to display the space between the characters in an original size.

Referring to screen 507 of FIG. 5, the controller 140 determines that the cursor movement termination event is generated at the end of the input characters 'morning ! ♡ ' (after '♡ '), through one of a touch event, a tap event, a flick event, and a pen-touch event. When the cursor movement termination event is generated, the controller 140 restores a position of the cursor and the size of the space between the characters, so as to display the characters and the space between the characters in an original size, as shown in screen 508. That is, when the cursor movement termination event is generated in a state in which the character is displayed with enlarged space 2a, as shown in screen 507, the controller 140 restores the size of the space so as to display the size of the space as original space 1a, as shown in screen 508.

When a cursor movement termination event is not generated at step 415, the controller 140 proceeds with step 407 and checks for whether a positional movement of the cursor is sensed.

As described above, when an area select request event for selecting a partial area of the characters displayed on an input screen is generated, the controller 140 enlarges for display, the size of the space between the characters within the selected area. The controller 140 may enlarge the size of the space between the characters for display in a predetermined area adjacent to the selected area. In addition, the controller 140 senses the movement of the cursor for selecting a part of the characters displayed in an enlarged selected area, so as to more accurately adjust the selected area. The movement of the cursor may be executed by moving the cursor through two handlers. In addition, a user input event, such as, inserting a character, deleting a character, inputting an indent, inputting a line feed, converting a Hangul character into a Chinese character, and the like, may be sensed from a position to which the cursor is moved. Subsequently, the controller 140 may execute a predetermined function corresponding to the user input event. When the movement of the cursor stops, the controller 140 restores a position of the cursor and the size of the characters and the space between the characters, so as to display the character in an original size.

As described above, when a cursor is moved on an input screen or an event of selecting a partial area of the displayed characters using movement of a cursor is generated, the controller 140 enlarges the size of the space between the characters by a predetermined ratio and displays the same. The characters and the space between the characters are enlarged and thus, a user may more accurately adjust the position of the cursor. Accordingly, a distance in which the cursor moves may become longer.

Although the method and the apparatus for controlling a position of a cursor in an electronic device have been described, the embodiments and the terms provided herein are merely used to easily describe technical contents of the present invention and to assist understanding of the present invention, and the present invention is not limited to the embodiments provided herein. That is, while the present invention has been shown and described with reference to certain embodiments thereof, it will be understood by those skilled in the art that various changes in form and details may be made therein without departing from the spirit an scope of the present invention defined by the following claims and their equivalents.

What is claimed is:

1. A method of controlling a position of a cursor in a portable terminal, the method comprising:
    displaying a plurality of characters on a display screen in response to a plurality of touch inputs on a input screen;
    detecting an input for moving a cursor;
    moving the cursor between two of the plurality of characters, in response to the input;
    modifying at least two characters designated based on a position of the cursor displayed on the display screen; and
    restoring the modified at least two characters, when the designation of the at least two characters is cancelled,
    wherein modifying the designated at least two characters comprises enlarging a space between the designated at least two characters,
    wherein modifying the at least two characters comprises:
    changing a size of the space between characters at the position of the cursor and in a predetermined adjacent area in an upward, downward, left, and right direction from the position of the cursor, for display; and
    sensing an area select request event for selecting an area for enlarging the space between the designated at least two characters, and
    wherein, when the area select request event is sensed, the cursor is formed to include a first handler and a second handler, and the area is selected by moving the first handler and the second handler.

2. The method of claim 1, wherein modifying the at least two characters further comprises:
    moving the cursor to a designated position, when the position of the cursor is designated.

3. The method of claim 2, wherein modifying the at least two characters further comprises:
    detecting an input event corresponding to the position of the cursor, when movement of the cursor stops.

4. The method of claim 3, wherein the input event is at least one event of inserting a character, deleting a character, inputting an indent, inputting a line feed, and converting a Hangul character into a Chinese character.

5. The method of claim 2, wherein moving the cursor comprises:
    moving the cursor when at least one of a touch event, a tap event, a flick event, a pen-touch event, a double-touch event, and a double-tap event is detected.

6. The method of claim 1, wherein restoring the modified at least two characters comprises restoring the space between the characters, which have been enlarged.

7. The method of claim 1, wherein the area select request event corresponds to at least one of a drag event, a swipe event, a drag-and-drop event, a pinch zoom event, and a hovering event.

8. The method of claim 1, wherein displaying the plurality of characters on the display screen comprises:
    displaying the input screen in which the plurality of characters are input or the display screen that displays the plurality of characters.

9. The method of claim 1, wherein restoring the modified at least two characters comprises:
    restoring a size of the space between the designated at least two characters to an original size, when movement of the cursor is not sensed during a predetermined period of time or a cursor movement termination event is sensed.

10. The method of claim 9, wherein the cursor movement termination event is at least one of a touch event, a tap event, a flick event, a pen-touch event, a double-touch event, and a double-tap event provided at an end of displayed characters.

11. An apparatus for controlling a position of a cursor in a portable terminal, the apparatus comprising:
- a display panel configured to display a plurality of characters and a cursor;
- a touch panel; and
- a controller configured to:
  - cause the display panel to display the plurality of characters on a display screen in response to a plurality of touch inputs on an input screen;
  - detect an input for moving a cursor using the touch panel;
  - move the cursor between at least two of the plurality of characters, in response to the input;
  - modify the at least two characters designated based on a position of the cursor displayed on the display screen; and
  - restore the modified at least two characters, when the designation of the at least two characters is cancelled,
  - wherein the controller is further configured to modify the at least two characters designated based on the position of the cursor displayed on the display screen by enlarging a space between the designated at least two characters,
  - wherein the controller is further configured to move the cursor to a designated position, when the designation of the position of the cursor is sensed, and control a size of the space between the at least two characters at the position of the cursor and in a predetermined adjacent area in an upward, downward, left, and right direction from the position of the cursor, and
  - wherein the controller is further configured to select an area by moving a first handler and a second handler, which form the cursor, when an area select request event is detected, and process the selected area.

12. The apparatus of claim 11, wherein the controller is further configured to detect an input event at a position to which the cursor is moved, wherein the input event is at least one of inserting a character, deleting a character, inputting an indent, inputting a line feed, and converting a Hangul character into a Chinese character.

13. The apparatus of claim 11, wherein the controller is further configured to select the area by using at least one of a drag event, a swipe event, a drag-and-drop event, a pinch zoom event, and a hovering event.

14. The apparatus of claim 11, wherein the controller is further configured to sense a movement of the cursor, and to move the cursor when at least one of a touch event, a tap event, a flick event, a pen-touch event, a double-touch event, and a double-tap event is sensed.

15. The apparatus of claim 11, wherein the controller is further configured to restore the size of the space between the at least two characters to an original size, when movement of the cursor is not sensed during a predetermined period of time or a cursor movement termination event is sensed.

16. The apparatus of claim 15, wherein the cursor movement termination event is at least one of a touch event, a tap event, a flick event, a pen-touch event, a double-touch event, and a double-tap event provided at an end of displayed characters.

* * * * *